United States Patent [19]
Gutta et al.

[11] Patent Number: 6,122,693
[45] Date of Patent: Sep. 19, 2000

[54] PCI BUS UTILIZATION DIAGNOSTIC MONITOR

[75] Inventors: Srinivasa Gutta, Allentown, Pa.; Raman Parthasarathy, North Brunswick, N.J.; Walter G. Soto, Irvine, Calif.

[73] Assignee: Lucent Technologies, Inc., Murray Hill, N.J.

[21] Appl. No.: 09/140,672

[22] Filed: Aug. 26, 1998

Related U.S. Application Data

[60] Provisional application No. 60/065,855, Nov. 14, 1997.

[51] Int. Cl.$^7$ ..................................... G06F 11/34
[52] U.S. Cl. ............................. 710/107; 714/47
[58] Field of Search ................... 710/107, 126, 710/129; 702/110, 117, 118, 120; 714/30, 43, 47, 56, 733, 734

[56] References Cited

U.S. PATENT DOCUMENTS

| | | | |
|---|---|---|---|
| 5,689,691 | 11/1997 | Mann | 713/502 |
| 5,896,552 | 4/1999 | Kowert et al. | 710/55 |
| 5,913,043 | 6/1999 | Carter et al. | 710/100 |
| 5,919,268 | 7/1999 | McDonald | 714/47 |
| 5,944,840 | 8/1999 | Lever | 714/34 |
| 6,018,803 | 1/2000 | Kardach | 713/323 |

*Primary Examiner*—Glenn A. Auve
*Attorney, Agent, or Firm*—William H. Bollman

[57] ABSTRACT

The present invention provides a PCI Bus Diagnostic Monitor which eliminates the need to hook up a logic analyzer and manually analyze the data passing on the PCI Bus. The present invention provides an accurate analysis of the PCI Bus master's utilization and/or latency time to acquire the PCI Bus by controlling a 12-bit counter and analyzing count values at appropriate times, e.g., between the time the PCI Bus request is output and the time that the data transfer begins, and the time between when the data transfer begins and when the data transfer ends. The data corresponding to a large number of data transfers may be buffered and analyzed to provide performance statistics relating to the PCI Bus. The analysis can be performed in lightly loaded, typically loaded, and heavily loaded PCI bus situations to fully and accurately test real-world capabilities of new peripherals, particular combinations of peripherals, and statistics relating to customized usage of a host system. The accurate statistics relating to the performance of the PCI Bus will also allow a system designer to assign and/or reassign PCI Bus priorities for various bus agents or peripherals.

25 Claims, 5 Drawing Sheets

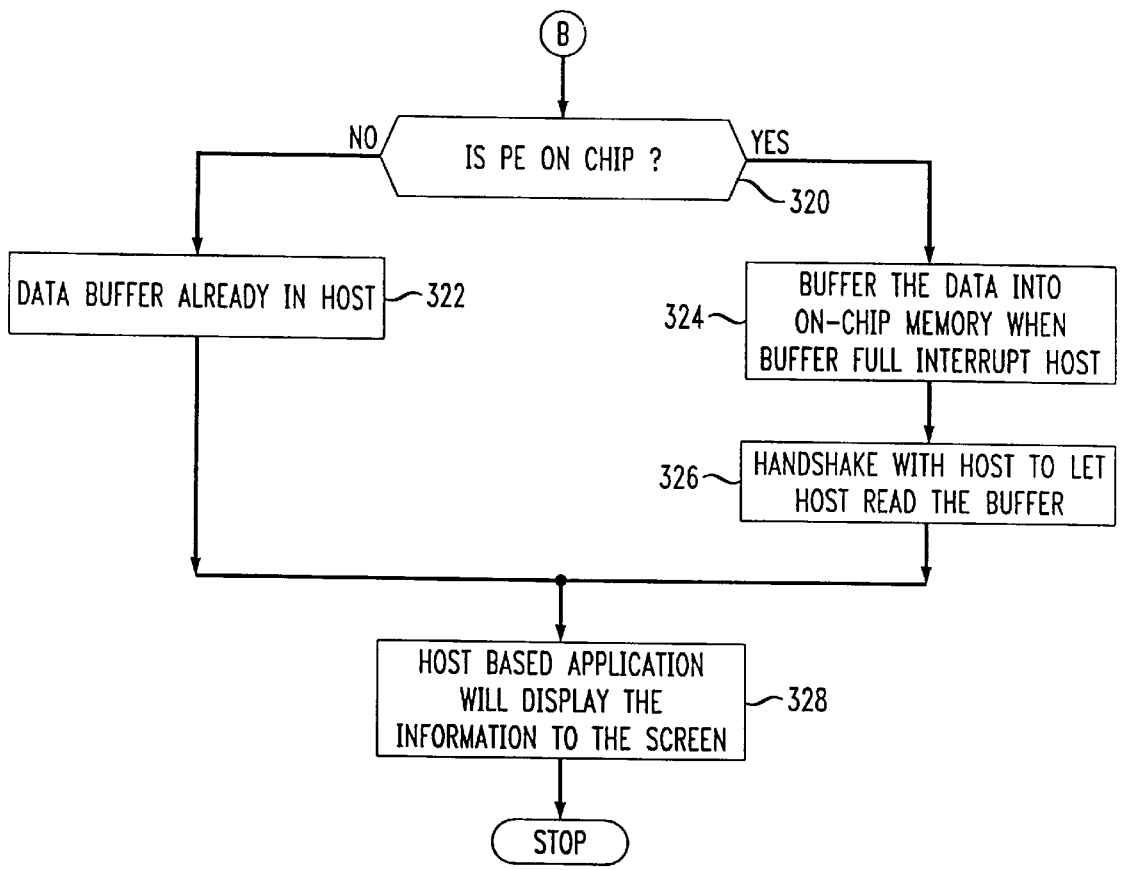

PCI BUS UTILIZATION DIAGNOSTIC MONITOR

This application claims priority from U.S. Provisional application Ser. No. 60/065,855 entitled "Multipurpose Digital Signal Processing System" filed on Nov. 14, 1997, the specification of which is hereby expressly incorporated herein by reference.

BACKGROUND OF THE INVENTION

1. Field of the Invention

This invention relates generally to diagnostics of a Peripheral Component Interconnect (PCI) Bus. More particularly, it relates to a technique for determining statistics relating to the usage of a PCI Bus.

2. Background of Related Art

The Peripheral Component Interconnect (PCI) Bus is fast becoming the bus of choice for personal computers, eventually eliminating the traditional Industry Standard Architecture (ISA) bus. The PCI Bus is a standard for connecting peripherals to a personal computer, released in the Fall of 1993. PCI is supported by most major manufacturers, with initial implementations running at 33 MHz. PCI is processor independent and thus can work with various processor architectures.

Technically, PCI is not a bus but a bridge which forwards traffic between network segments, i.e., between peripheral components and the central processor unit (CPU). The PCI Bus includes buffers to decouple the CPU from relatively slow peripherals and allow them to operate asynchronously.

FIG. 5 shows a conventional PCI Bus with a group of conventional components interconnected thereby.

In particular, a primary PCI Bus 102 passes data between a host central processing unit (CPU) 108, PCI slave only devices 116, 118, PCI master capable devices 114, 120, and/or a bridge to a secondary PCI Bus 124. As is defined by the current implementations of the PCI Bus Specification, up to 256 PCI Buses may be bridged in a hierarchy which is somewhat invisible to the primary PCI Bus 102.

The host CPU 108 may be any processor, e.g., microprocessor, microcontroller, or digital signal processor (DSP). The host CPU 108 communicates with a host PCI bridge 104 over a host bus 110. The host bus is a bus having a protocol which typically is specific to the host CPU 108. The host PCI bridge 104 routes signals to and from the host bus 110 either to memory, e.g., synchronous or non-synchronous dynamic random access memory (SDRAM or DRAM) 106, or to other components in communication with the primary PCI Bus 102. The host PCI bridge 104 routes data to and from the host bus 110 based on the addressing of the data, including memory or I/O mapped addressing.

Possible devices communicating over a PCI Bus include PCI bridges 104, 122, master capable devices 114, 120, and slave only devices 116, 118. PCI bridges 104, 122 provide routing of addressed information between different buses. PCI master capable devices are those devices which are capable of initiating and transferring data to any other PCI device on the PCI bus 102, e.g., another processor such as a DSP, or an ASIC with direct memory access (DMA) channels, without any involvement of the host processor. PCI slave only devices 116, 118 are those devices which cannot act as a master or otherwise cannot initiate a data transfer on their own. For example, memory devices.

Each PCI bridge, e.g., the host PCI bridge 104 and the PCI-to-PCI bridge 122 includes logic to implement a PCI bus arbiter 104a, 122a for arbitrating use of the underlying PCI Bus. For instance, the host PCI bridge 104 provides arbitration for the primary PCI Bus 102 between a plurality of request signals REQ by outputting appropriate grant signals GNT to allow use of the PCI Bus by one component at a time. Similarly, the PCI-to-PCI bridge 122 provides arbitration for the secondary PCI Bus 124. Master capable devices arbitrate for use of the primary PCI Bus 102 by activating (i.e., pulling low) the associated request signal REQ, and are given in return a 'you're next' signal by an activation of the associated grant signal GNT at the appropriate time based on a predefined arbitration scheme.

Due to the enormous bandwidth available, flexibility, scaleability and interoperability of the PCI Bus, more and more hardware logic is being pushed onto the PCI Bus, e.g., graphic cards for accelerated graphical user interface (GUI) performance, full motion video, audio cards and alternative buses such as the Small Computer System Interface (SCSI) bus. However, the overall system performance of the overall system may be degraded as these high bandwidth functions are pushed onto the PCI Bus due to increased latency in acquiring the PCI Bus and in increased latency or data transfer time for any one data transfer, without regard for individual PCI Bus agent bandwidth requirements.

Conventionally, to determine statistics relating to a PCI Bus such as that shown in FIG. 5, system designers hook up a logic analyzer 500 to the PCI Bus (e.g., primary PCI Bus 102) to manually analyze data patterns transferring across the PCI Bus 102. This technique is time consuming, typically performed when the system is off-line, and/or may not provide statistics for a large number of data transfers on an ongoing basis.

There is thus a need for an efficient and simple PCI Bus diagnostic technique for enabling a user to carefully integrate PCI functions in a host system, and for enabling a user without special training to perform diagnostics on a fully functional PCI Bus.

SUMMARY OF THE INVENTION

It is an aspect of the invention to provide a bus diagnostic monitor comprising an interface bus, a plurality of master capable devices in communication with the interface bus, and a counter in communication with the interface bus and with the plurality of master capable devices. The counter is adapted to initiate a count when one of the plurality of master capable devices outputs a request for use of the interface bus, and to output a count value at a point corresponding to a function of a related data transfer.

A method of analyzing performance of an interface bus in accordance with the present invention comprises starting a counter based on a request for access to the interface bus, and storing a value of the counter at a point corresponding to a predetermined milestone in a data transfer corresponding to the request for access to the interface bus.

BRIEF DESCRIPTION OF THE DRAWINGS

Features and advantages of the present invention will become apparent to those skilled in the art from the following description with reference to the drawings, in which:

FIGS. 3A and 3B are a process flow chart showing the analysis of request signal latency and data transfer time using a PCI Bus Diagnostic Monitor as shown in FIG. 1, in accordance with the principles of the present invention.

FIG. 4 is an exemplary diagnostic display table based on information obtained from a PCI Bus Diagnostic Monitor in accordance with the principles of the present invention.

DETAILED DESCRIPTION OF ILLUSTRATIVE EMBODIMENTS

The present invention provides a non-intrusive and efficient method and apparatus for providing statistics relating to the usage of an active PCI Bus. In the disclosed embodiment, a diagnostic Monitor is connected to a PCI Bus to provide statistics relating to the PCI Bus suitable for analyzing the performance of PCI Bus functions in a host system.

Figure 1:
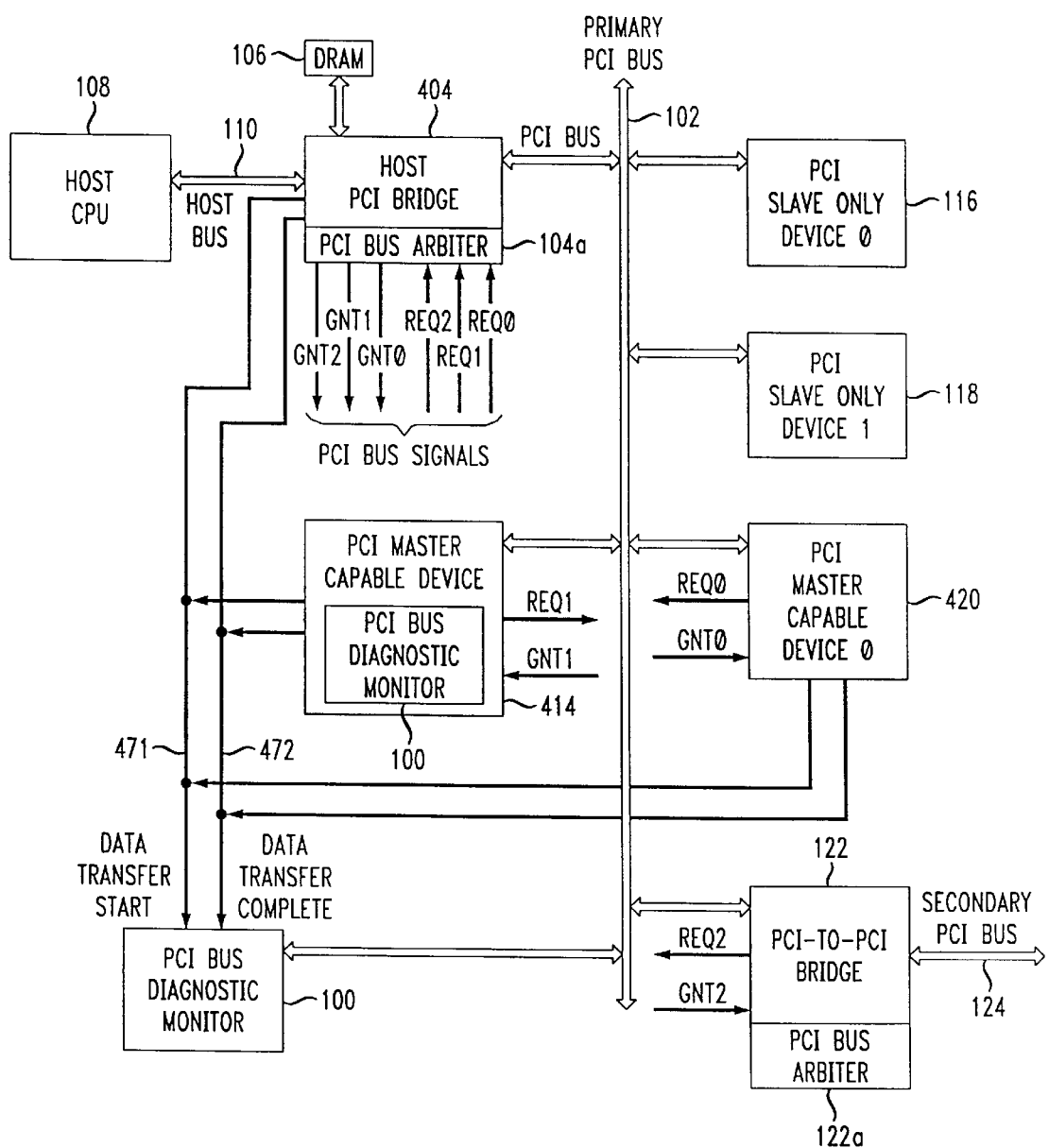
FIG. 1 shows the use of an embodiment of a PCI Bus Diagnostic Monitor in a PCI Bus in accordance with the principles of the present invention.

FIG. 1 shows the inclusion of a PCI Bus Diagnostic Monitor 100 in a PCI Bus system in accordance with the principles of the present invention.

In particular, FIG. 1 shows a PCI Bus Diagnostic Monitor 100 in communication with a primary PCI Bus 102. Of course a PCI Bus Diagnostic Monitor 100 may be connected to a secondary or other PCI Bus in accordance with the principles of the present invention.

The PCI bus diagnostic monitor 100 of the disclosed embodiment resides in each of the master capable devices, e.g., a host PCI bridge 404 and other PCI master capable devices 414, 420. The diagnostic monitor embedded within a PCI device will gather the statistics of the respective device. The diagnostic monitor will receive control signals from the master capable devices.

A first control signal 471 relates to a start point of data transfer over the PCI Bus 102 as controlled by the respective master device, and a second control signal 472 relates to a completion point of the relevant data transfer.

Figure 2A:
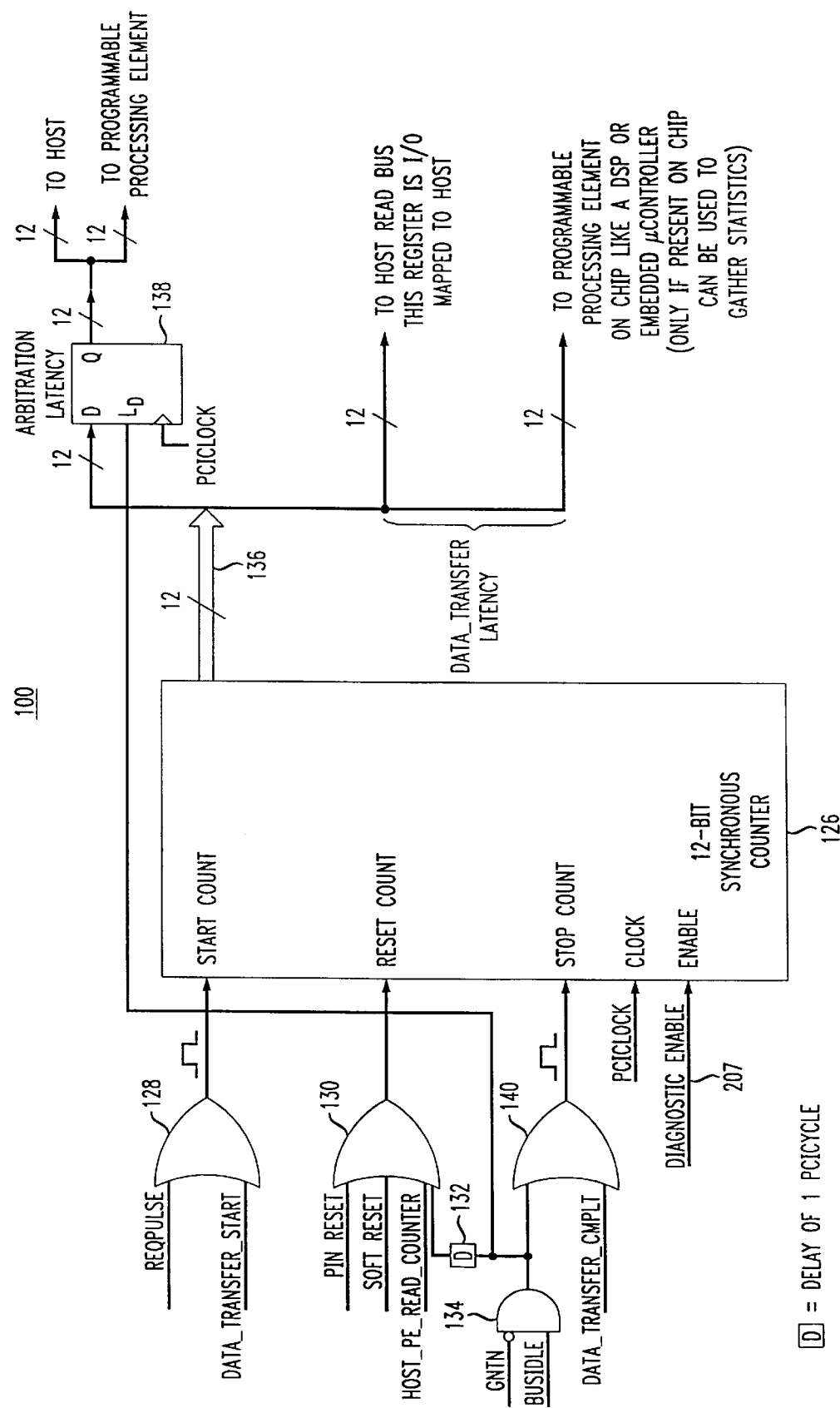
FIGS. 2A and 2B show a PCI Bus Diagnostic Monitor of FIG. 1 in more detail.
Figure 2B:
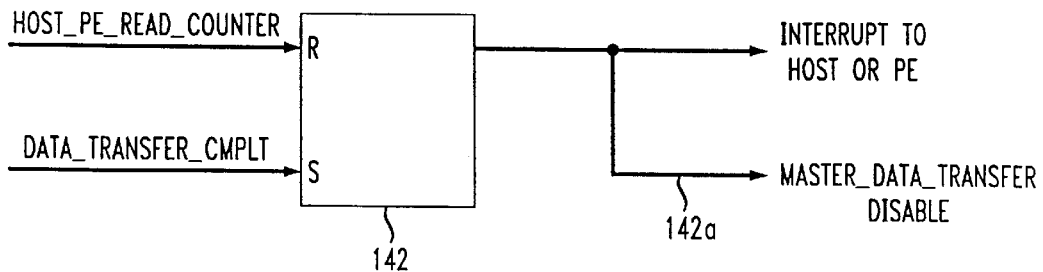

FIGS. 2A and 2B show the PCI Bus Diagnostic Monitor 100 of FIG. 1 in more detail.

As shown in FIG. 2A, a counter 126, e.g., a 12-bit synchronous counter, is controlled to output timer values which may be latched or read to correspond to the elapsed time of certain PCI Bus functions in an active PCI Bus.

For instance, a first value may be read or latched relating to an amount of time or a number of clock cycles which have elapsed between the time when a request signal REQ# for the PCI Bus for a particular device is output to the PCI Bus master, e.g., host PCI bridge 404, and the time that the requested data transfer begins. Thus, the counter will start counting from the time the PCI Bus master outputs a PCI Bus request. Once the PCI Bus has been granted as indicated by the GNT#, the value of the counter is stored, e.g., in a register or in memory. At this point, the counter is preferably cleared to allow the maximum capacity of the counter for the next phase. However, the counter need not be cleared given that the count at the point of the PCI Bus grant is stored and may be subtracted from a subsequent cumulative counter value.

The counter then restarts counting or continues to count until the requested data transfer has been completed, to provide an example of a second value which relates to an amount of time or a number of clock cycles which have elapsed between the time that the particular data transfer begins and when that data transfer is completed. When the data transfer is complete, the PCI Bus master preferably generates an interrupt to the host CPU or other processing element performing an analysis of the relevant functions of the PCI Bus. Of course, other forms of communicating between the PCI Bus and the host CPU or other processor are possible within the scope of the present invention.

The size of the counter 126 is preferably sufficient to count a maximum possible amount of time for a proper data transfer without wrapping around. For the exemplary embodiment using a 33 Megahertz (MHz) PCI clock, a counter 126 having a length of at least 12-bits was determined to be suitable. However, the size of the counter 126 will be based on the particular application. Moreover, the counter 126 is preferably clocked by either the PCI Bus clock or a signal synchronous with the PCI Bus clock, but may be clocked by a clock other than the PCI clock within the principles of the present invention.

The counter 126, and thus the PCI Bus Diagnostic Monitor 100, can be enabled and disabled using a diagnostic enable signal 207. The diagnostic enable signal 207 may be output based on a bit of a suitable control register.

The counter 126 is clocked by any suitable clock, but preferably a clock synchronous with the PCI Bus to which the PCI Bus Diagnostic Monitor 100 is connected. In the disclosed embodiment, the counter 126 is clocked by the PCI Clock 160 in the primary PCI Bus 102. Currently, the PCI Clock 160 is 33 MHz, but may be any other value, e.g., 66 MHz.

The disclosed counter 126 is started with a pulse formed by an event associated with the function for which statistics are being gathered for. For instance, in the disclosed embodiment wherein latency in the bus request signal and data transfer time are being measured, the counter 126 is started by the beginning of either of these events. Thus, for instance, in the disclosed embodiment the counter 126 is started by a logical OR of the REQPULSE signal from the primary PCI Bus 102 (or whatever PCI Bus that the PCI Bus Diagnostic Monitor 100 is connected to), and a signal from the current master device indicating the point at which the data transfer starts. The REQPULSE signal and the DATA_ TRANSFER_START signals are active high, and create a pulse to the start count input of the counter 126 on the respective rising edges.

The output of the counter 126 is read and/or latched at the appropriate time based on the desired function of the PCI Bus being measured. For instance, in the disclosed embodiment, the counter 126 is stopped for reading and/or latching of the output when either both the bus is not granted and the bus is idle, as determined by logic AND gate 134, or when the DATA_TRANSFER_COMPLETE signal first goes active, as determined by logical OR element 140. The DATA_TRANSFER_COMPLETE signal is provided at the appropriate time by a master capable device connected to the relevant PCI Bus, e.g., a DMA engine or processor.

After measurement of applicable functions of the relevant PCI Bus, the counter 126 is reset. In the disclosed embodiment, the counter 126 is reset between measurement of the request signal latency and the start of the data transfer measurement, and after the data transfer measurement.

Thus, a number of signals are logically ORed in an OR gate 130 to reset the counter 126. For instance, a reset pin in the relevant PCI Bus may cause the counter 126 to reset. Alternatively, application or other software may write to a relevant register which provides a SOFT RESET signal to the OR gate 130. Another function to cause a reset of the counter 126 is a read signal from a processing element (PE) on the PCI bus, indicated by the HOST_PE_READ_COUNTER signal into the OR gate 130. A fourth mechanism to reset the counter 126 is the output of the AND gate 134, delayed by one PCI clock cycle by a delay element 132.

The AND gate 134 resets the counter 126 after a value is loaded into a register for reading by a device on the PCI Bus, e.g., arbitration latency register 130, using the output of the AND gate 134 as a load signal. The delay element 132 allows the register 138 time to store a particular count value of the counter 126, e.g., the request signal latency, before the counter 126 is reset. The register 138 may be read by the host CPU 108 (FIG. 1), or any other master capable processing element (PE) connected to the primary PCI Bus 102.

A plurality of registers may be implemented and loaded at appropriate times for reading by a master capable device, although in the disclosed embodiment of measurement of latency in a request signal and data transfer time only one register is necessary. The elapsed time of the request signal latency is loaded into the latency register 138 at the appropriate time, while the output of the counter 126 is read directly, e.g., by the host CPU 108 or other PE.

FIG. 2B symbolizes a latch of an interrupt signal to the host CPU 108 or other PE connected to the primary PCI Bus 102 performing the PCI Bus statistical analysis that the data transfer is completed and that the output of the counter 126 should be read. As part of its interrupt service routine (ISR), the host will read the value of the counter and clear the interrupt. Once the interrupt is cleared, the PCI Bus master is then ready to start the next data transfer.

In particular, a flip/flop 142 is set when the data transfer signal DATA_TRANSFER_CMPLT becomes active, and reset after the interrupted host CPU 108 or other PE reads the value of the counter. While the interrupt to the host CPU 108 is active, further action on the primary PCI Bus 102 is preferably paused using a signal such as the MASTER_DATA_TRANSFER DISABLE signal 142a until the current state of the counter 126 is read. Thus, the PCI Bus master will not perform any transfers from the time of the assertion of the interrupt to the time that the interrupt is cleared.

Figure 3A:
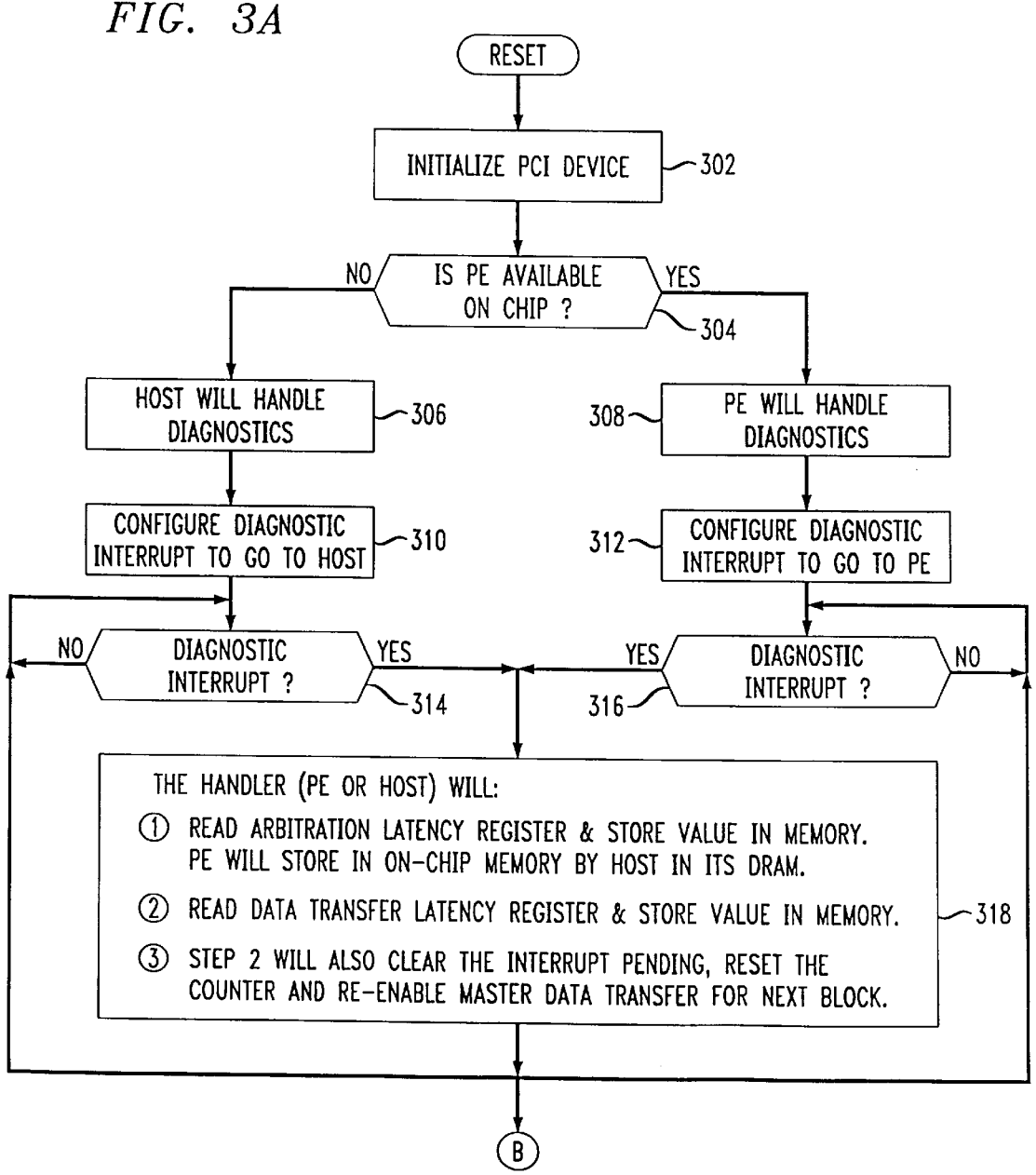
Figure 5:
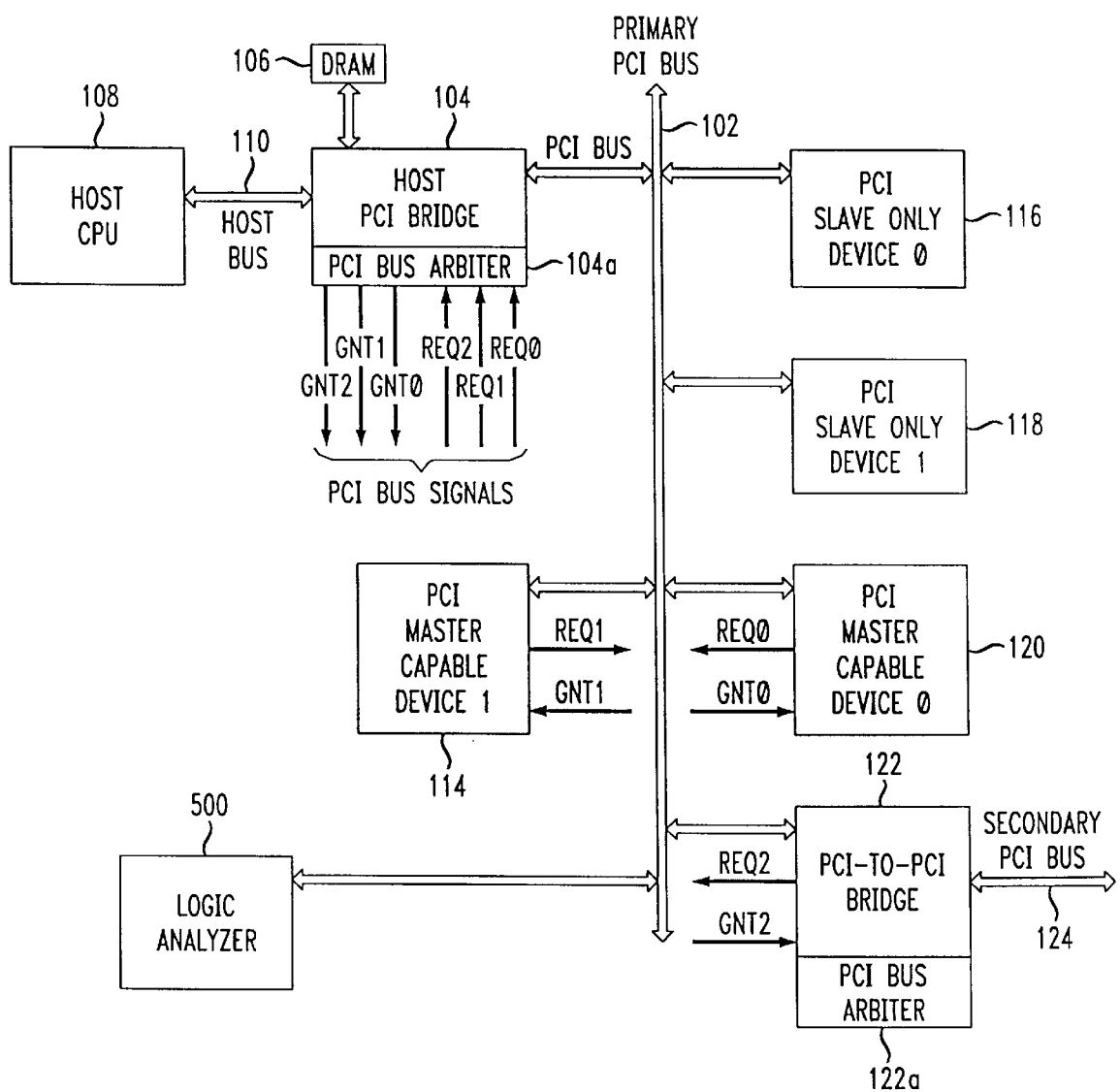
FIG. 5 shows a conventional PCI Bus with exemplary devices connected thereto.

FIGS. 3A and 3B show an exemplary use of a PCI Bus Diagnostic Monitor to analyze request signal latency and data transfer time in accordance with the principles of the present invention.

Software running on the host can analyze both count values to provide informative statistics on the usage and performance of the PCI Bus. For instance, latency time can be determined by an analysis of the time required for a grant of the PCI Bus. Statistics such as a worst case, best case, average and/or mean latency time can be provided.

Similarly, the worst case, best case, average and/or mean time for actual transfer of data can be determined by analyzing the total counter value after the data transfer is complete. If the counter is not restarted before the data transfer is begun, then the value of the counter after the data transfer is completed will be adjusted appropriately, e.g., by subtracting the counted time for grant of the PCI Bus.

In particular, as shown in FIG. 3A the PCI Bus Diagnostic Monitor 100 (FIG. 1) is appropriately initialized in step 302, e.g., the counter 126 is reset.

In step 304, it is determined which device connected to the PCI Bus will handle gathering elapsed time statistics from the PCI Bus Diagnostic Monitor 100. For instance, if a processing element (PE) is not on chip, then the host CPU 108 will handle processing the PCI Bus statistics as shown in step 306. Otherwise, the PE will handle processing the PCI Bus statistics as shown in step 308.

An appropriate interrupt for the PCI Bus Diagnostic Monitor is assigned either in the host (as shown in step 310) or in the PE (as shown in step 312). The interrupt in the disclosed embodiment relates to the time at which the latency register holding the latency time of the relevant request signal should be read, and the time at which the output of the counter 126 relating to the length of the most recent data transfer should be read. As shown in steps 314 and 316, the analysis will pause until an interrupt occurs indicating valid latency and data transfer counter values.

In step 318, the processor (i.e., the PE or host CPU) will appropriately analyze the counter values read from the PCI Bus Diagnostic Monitor 100 and provide appropriate results, e.g., in the form of a Table such as is shown in FIG. 4. Thus, in FIG. 3A, the processor will (1) read the arbitration latency register 138 (FIG. 2A) and store that value in memory. The processor, if a PE, will preferably store the latency value in on-chip memory whereas the processor, if a host CPU, will preferably store the latency value in its associated DRAM 106 (FIG. 1). The processor will also (2) read the output of the counter 126, either directly or through another register (not shown), corresponding to the elapsed time of the data transfer, and store that value in memory. The processor will also clear its pending interrupt from the PCI Bus Diagnostic Monitor, reset the counter 126 and re-enable subsequent data transfers on the primary PCI Bus 102.

FIG. 3B continues the flow chart of FIG. 3A. In step 320 of FIG. 3B, it is determined if the PE is on- or off-chip. If the PE is off-chip, the necessary data (i.e., the latency and data transfer elapsed times) are already in memory as performed by the previous step 318. However, if the PE is on-chip, the PE may buffer on-going statistical data for, e.g., the latency and/or data transfer elapsed time, and interrupt the host CPU when the buffer is full, or half full, or otherwise reaches a threshold point, as indicated by step 324. For instance, data relating to 1000 sequential data transfers may be sampled and buffered before transfer to the host CPU 108. Moreover, the PCI Bus Diagnostic Monitor may be disabled while the host CPU 108 processes the buffered data.

Step 326 indicates that a handshake is preferably performed as between the host CPU 108 and the location of the buffered data. For instance, the buffered data may be transferred to the DRAM 106 of the host CPU 108 only after the buffer becomes full or half full.

The statistics can be displayed, printed and/or otherwise communicated in many forms, e.g., in tabular form, or passed to another device connected to the PCI Bus for use in configuration of that device or other tasks based on the current performance of the PCI Bus, as indicated in step 328. For instance, certain devices connected to the PCI Bus may scale back their respective use of the PCI Bus as current performance levels drop below predetermined threshold levels. Similarly, as current performance of the PCI Bus increases, e.g., if the average total latency time is less than a predetermined threshold, then certain devices may make additional or extensive use of the PCI Bus. This allows for efficient use of the PCI Bus during slower periods.

FIG. 4 shows an exemplary diagnostic display table based on information obtained from a PCI Bus Diagnostic Monitor in accordance with the principles of the present invention.

In particular, up to one hundred of the most recent data transfers may be listed sequentially in tabular form as shown in FIG. 4. Of course, the invention is equally applicable to the analysis of any number of data transfers or other PCI Bus functions. An arbitration latency (in $\mu S$) determined directly from the number of PCI clock cycles read from the arbitration register 138 (FIG. 2A) is shown for each data block, e.g., for data blocks 1 through 100. Additionally, in the disclosed embodiment, a data transfer latency (in µS) is shown for each data block, as is a total latency (in µS) determined by an addition of both the arbitration latency and data transfer latency for each data block.

Other analysis may be provided. For instance, a mean and/or an average of the displayed one hundred data blocks may also be displayed.

Of course, the diagnostic data may be analyzed using other methods and/or algorithms related to performance of a PCI Bus. Moreover, while the present invention is described with reference to a PCI Bus, the principles of the present invention are equally applicable to any bus standard having functions which can preferably be measured by a synchronous clock.

It will be understood by those of ordinary skill in the art that the specific logic levels described with respect to the disclosed embodiments may be reversed and other logic elements implemented within the scope of the present invention.

While the diagnostics Monitor of the disclosed embodiment relates to statistics measured from the time a bus request is output by the requesting device to the time the data transfer begins, and again to the time the requested data transfer has been completed, the present invention relates equally to statistics gathered at different points in time in a PCI Bus transaction. Moreover, while the present invention is described with respect to a specific implementation in a PCI Bus, the principles of the present invention are equally applicable to bus systems having latency concerns.

The present invention eliminates the need to hook up a logic analyzer and manually analyze the data passing on the PCI Bus. The present invention provides an accurate analysis of the PCI Bus master's utilization and/or latency time to acquire the PCI Bus. Moreover, the analysis can be performed in lightly loaded, typically loaded, and heavily loaded PCI bus situations to fully and accurately test real-world capabilities of new peripherals, particular combinations of peripherals, and statistics relating to customized usage of a host system. The accurate statistics relating to the performance of the PCI Bus will also allow a system designer to assign and/or reassign PCI Bus priorities for various bus agents or peripherals.

While the invention has been described with reference to the exemplary embodiments thereof, those skilled in the art will be able to make various modifications to the described embodiments of the invention without departing from the true spirit and scope of the invention.

What is claimed is:

1. A bus diagnostic monitor comprising:
   an interface bus;
   at least one master capable device in communication with said interface bus; and
   a counter in communication with said interface bus and with said at least one master capable device;
   said counter being adapted to initiate a count when said at least one master capable device outputs a request for use of said interface bus, and to output a count value at a point corresponding to a function of a related data transfer.

2. The bus diagnostic monitor according to claim 1, wherein:
   said interface bus is a PCI bus.

3. The bus diagnostic monitor according to claim 2, wherein:
   said point corresponding to said function is a start of said data transfer.

4. The bus diagnostic monitor according to claim 3, further comprising:
   a storage device to store a counter value of said counter at said point corresponding to a function of a related data transfer.

5. The bus diagnostic monitor according to claim 4, wherein:
   said stored counter value corresponds to a start of said data transfer.

6. The bus diagnostic monitor according to claim 2, wherein:
   said point corresponding to said function is a completion of said data transfer.

7. The bus diagnostic monitor according to claim 2, wherein:
   said counter comprises at least 12 bits.

8. The bus diagnostic monitor according to claim 2, wherein:
   said counter is clocked based on a PCI clock signal from said PCI bus.

9. The bus diagnostic monitor according to claim 1, further comprising:
   a PCI bus master;
   said counter being controlled by functions of said PCI bus master.

10. The bus diagnostic monitor according to claim 1, wherein:
    said counter comprises at least 12 bits.

11. The bus diagnostic monitor according to claim 1, wherein:
    said counter is clocked synchronously with said interface bus.

12. A method of analyzing performance of an interface bus, comprising:
    starting a counter based on a request for access to said interface bus; and
    storing a value of said counter at a point corresponding to a predetermined milestone in a data transfer corresponding to said request for access to said interface bus.

13. The method of analyzing performance of an interface bus according to claim 12, wherein:
    said predetermined milestone is a start of said data transfer.

14. The method of analyzing performance of an interface bus according to claim 13, wherein:
    said counter is stopped at a start of said data transfer.

15. The method of analyzing performance of an interface bus according to claim 12, wherein:
    said predetermined milestone is a completion of said data transfer.

16. The method of analyzing performance of an interface bus according to claim 12, wherein:
    said interface bus is a PCI bus.

17. The method of analyzing performance of an interface bus according to claim 12, further comprising:
    reducing use of said interface bus as a current performance level of said interface bus drops below a predetermined threshold level.

18. The method of analyzing performance of an interface bus according to claim 17, further comprising:
    increasing use of said interface bus as said current performance level of said interface bus raises above a predetermined threshold level.

19. Apparatus for analyzing performance of an interface bus, comprising:

counter means adapted to start counting based on a request for access to said interface bus;

means for storing a value of said counter means at a point corresponding to a predetermined milestone in a data transfer corresponding to said request for access to said interface bus.

20. The apparatus for analyzing performance of an interface bus according to claim 19, wherein:

said predetermined milestone is a start of said data transfer.

21. The apparatus for analyzing performance of an interface bus according to claim 20, wherein:

said counter means is further adapted to stop at a start of said data transfer.

22. The apparatus for analyzing performance of an interface bus according to claim 19, wherein:

said predetermined milestone is a completion of said data transfer.

23. The apparatus for analyzing performance of an interface bus according to claim 19, wherein:

said interface bus is a PCI bus.

24. The apparatus for analyzing performance of an interface bus according to claim 19, further comprising:

means for reducing use of said interface bus as a current performance level of said interface bus drops below a predetermined threshold level.

25. The method of analyzing performance of an interface bus according to claim 19, further comprising:

means for increasing use of said interface bus as said current performance level of said interface bus raises above a predetermined threshold level.

* * * * *